(12) United States Patent
Acuna et al.

(10) Patent No.: US 10,997,232 B2
(45) Date of Patent: May 4, 2021

(54) SYSTEM AND METHOD FOR AUTOMATED DETECTION OF FIGURE ELEMENT REUSE

(71) Applicants: Daniel Ernesto Acuna, Syracuse, NY (US); Konrad Kording, Philadelphia, PA (US)

(72) Inventors: Daniel Ernesto Acuna, Syracuse, NY (US); Konrad Kording, Philadelphia, PA (US)

(73) Assignees: SYRACUSE UNIVERSITY, Syracuse, NY (US); Northwestern University, Evanston, IL (US); Rehabilitation Institute of Chicago, Chicago, IL (US)

( * ) Notice: Subject to any disclaimer, the term of this patent is extended or adjusted under 35 U.S.C. 154(b) by 0 days.

(21) Appl. No.: 16/752,113

(22) Filed: Jan. 24, 2020

(65) Prior Publication Data

US 2020/0233900 A1 Jul. 23, 2020

Related U.S. Application Data

(60) Provisional application No. 62/795,662, filed on Jan. 23, 2019.

(51) Int. Cl.
*G06F 16/58* (2019.01)
(52) U.S. Cl.
CPC .................. *G06F 16/58* (2019.01)
(58) Field of Classification Search
CPC ....... G06F 16/58; G06F 16/583; G06F 16/532
See application file for complete search history.

(56) References Cited

U.S. PATENT DOCUMENTS

| 2011/0194772 A1* | 8/2011 | SanJuan | G06K 9/4671 |
| | | | 382/190 |
| 2011/0286631 A1* | 11/2011 | Wagner | G06K 9/32 |
| | | | 382/103 |
| 2012/0011119 A1* | 1/2012 | Baheti | G06K 9/4676 |
| | | | 707/737 |

(Continued)

FOREIGN PATENT DOCUMENTS

| WO | WO-2009085142 A2 * | 7/2009 | ........... G06F 16/583 |
| WO | WO-2012100819 A1 * | 8/2012 | ........... G06K 9/6211 |
| WO | WO-2013102488 A1 * | 7/2013 | ........... G06K 9/6211 |

*Primary Examiner* — Lewis G West
(74) *Attorney, Agent, or Firm* — Bond Schoeneck and King PLLC; David Nocilly (57) ABSTRACT

A system and method for automated detection of figure element reuse. The system can receive articles or other publications from a user input or an automated input. The system then extracts images from the articles and compares them to reference images from a historical database. The comparison and detection of matches occurs via a copy-move detection algorithm implemented by a processor of the system. The processor first locates and extracts keypoints from a submission image and finds matches between those keypoints and the keypoints from a reference image using a near neighbor algorithm. The matches are clustered and the clusters are compared for keypoint matching. Matched clusters are further compared for detectable transformations. The processor may additionally implement natural language processing to filter matches based on the context of the use of the submission image in the submission and a patch detector for removing false positive features.

20 Claims, 6 Drawing Sheets

(56) References Cited

U.S. PATENT DOCUMENTS

| | | | |
|---|---|---|---|
| 2012/0011142 A1* | 1/2012 | Baheti | G06K 9/4671 |
| | | | 707/769 |
| 2013/0163896 A1* | 6/2013 | Chen | G06T 7/37 |
| | | | 382/278 |
| 2014/0270348 A1* | 9/2014 | Wagner | G06K 9/3241 |
| | | | 382/103 |
| 2015/0070470 A1* | 3/2015 | McMurrough | G06K 9/6211 |
| | | | 348/46 |
| 2016/0155011 A1* | 6/2016 | Sulc | G06K 9/00671 |
| | | | 382/103 |
| 2016/0217394 A1* | 7/2016 | Silberman | A61B 5/168 |
| 2016/0259992 A1* | 9/2016 | Knodt | H04N 5/23245 |
| 2018/0376151 A1* | 12/2018 | Begaint | H04N 19/177 |

* cited by examiner

SYSTEM AND METHOD FOR AUTOMATED DETECTION OF FIGURE ELEMENT REUSE

CROSS-REFERENCE TO RELATED APPLICATION

The present application claims priority to and the benefit of U.S. Provisional Patent Application No. 62/795,662, filed on Jan. 23, 2019 and entitled "System and Method for Automated Detection of Figure Element Reuse," the entirety of which is incorporated herein by reference.

STATEMENT REGARDING FEDERALLY SPONSORED RESEARCH OR DEVELOPMENT

This invention was made with government support under Award No. 1646763 awarded by the National Science Foundation (NSF). The government has certain rights in the invention.

BACKGROUND OF THE INVENTION

1. Field of the Invention

The present invention generally relates to image processing and, more specifically, to a system and method for detecting image reuse in publications based on keypoint analysis and comparison.

2. Description of the Related Art

Due to technological advancements in image editing, it is possible to edit (e.g., rotate, resize, magnify, or crop) a first image to create a second image which is visibly distinct from the first image as determined by the human eye. In other words, the human eye cannot detect the similarities or identical features between the first image and the edited second image. Such image editing has gone undetected in the field of scientific publication. In particular, images from journal articles or other publications are frequently edited and reused in subsequent journal articles and publications. Inappropriate reuse of images is fraudulent, amounting to scientific misconduct. Such scientific misconduct undermines the integrity of the scientific publication and the other scientists published therein.

Recently, investigations have been launched to detect inappropriate reuse of images in scientific publications. However, current methods for detecting image reuse are tedious and heavily rely on analysis with the human eye. Accordingly, the current methods for analyzing images make it difficult to scale for large publications, which continuously receive large numbers of journal article submissions. Attempts at scaling the detection process have proved to be ineffective. Therefore, there is a need for a system and method for automated detection of inappropriate image reuse.

BRIEF SUMMARY OF THE INVENTION

The present invention is a system and a method for image reuse detection. According to one aspect, the present invention is a method for image reuse detection. The method includes the steps of: (i) receiving a submission at a processor from at least one of a connected user input and a connected automated input; (ii) extracting a submission image from the submission via a processor; (iii) locating and extracting keypoints from the submission image via the processor; (iv) comparing the keypoints from the submission image to keypoints from a reference image via the processor, wherein the reference image is stored in a historical database connected to the processor; (v) finding a plurality of matches, wherein in each match, a distance between two of the keypoints from the submission image is the same as the distance between two of the keypoints from the reference image, resulting in matched keypoints, wherein there are unmatched keypoints in the submission image and the reference image; (vi) clustering the unmatched keypoints in the submission image, forming a first cluster; (vii) clustering the unmatched keypoints in the reference image, forming a second cluster; (viii) matching the unmatched keypoints of the submission image in the first cluster with the unmatched keypoints of the reference image in the second cluster, forming a first matched cluster; and (ix) detecting a transformation between the first cluster and a second cluster.

According to another aspect, the method for image reuse detection includes the steps of: (i) receiving a submission at a processor from at least one of a connected user input and a connected automated input; (ii) extracting a submission image from the submission via the processor; (iii) locating and extracting keypoints from the submission image via the processor; (iv) comparing the keypoints from the submission image to keypoints from a reference image via the processor, wherein the reference image is stored in a historical database connected to the processor; (v) applying a nearest neighbor algorithm, via the processor, to the keypoints from the submission image and the keypoints from the reference image, resulting in one or more matched keypoints; (vi) transmitting, via the processor, the one or more matched keypoints to a results database connected thereto; (vii) displaying the matched keypoints at a user interface connected to the results database; and (viii) detecting a transformation between the reference image and the submission image.

According to yet another aspect, the present invention is a system for image reuse detection. The system includes a pre-processor storing a plurality of reference images. Each of the plurality of reference images includes a plurality of reference keypoints. The system also includes a processor connected to the pre-processor. The processor is adapted to receive or retrieve a submission. The submission comprises one or more submission images. Each submission image has a plurality of submission keypoints. At least some of the plurality of submission keypoints match at least some of the plurality of reference keypoints, resulting in a matched image. The system additionally includes a results database connected to the processor storing the matched image. The matched image indicates a transformation between the reference image and the one or more submission images.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
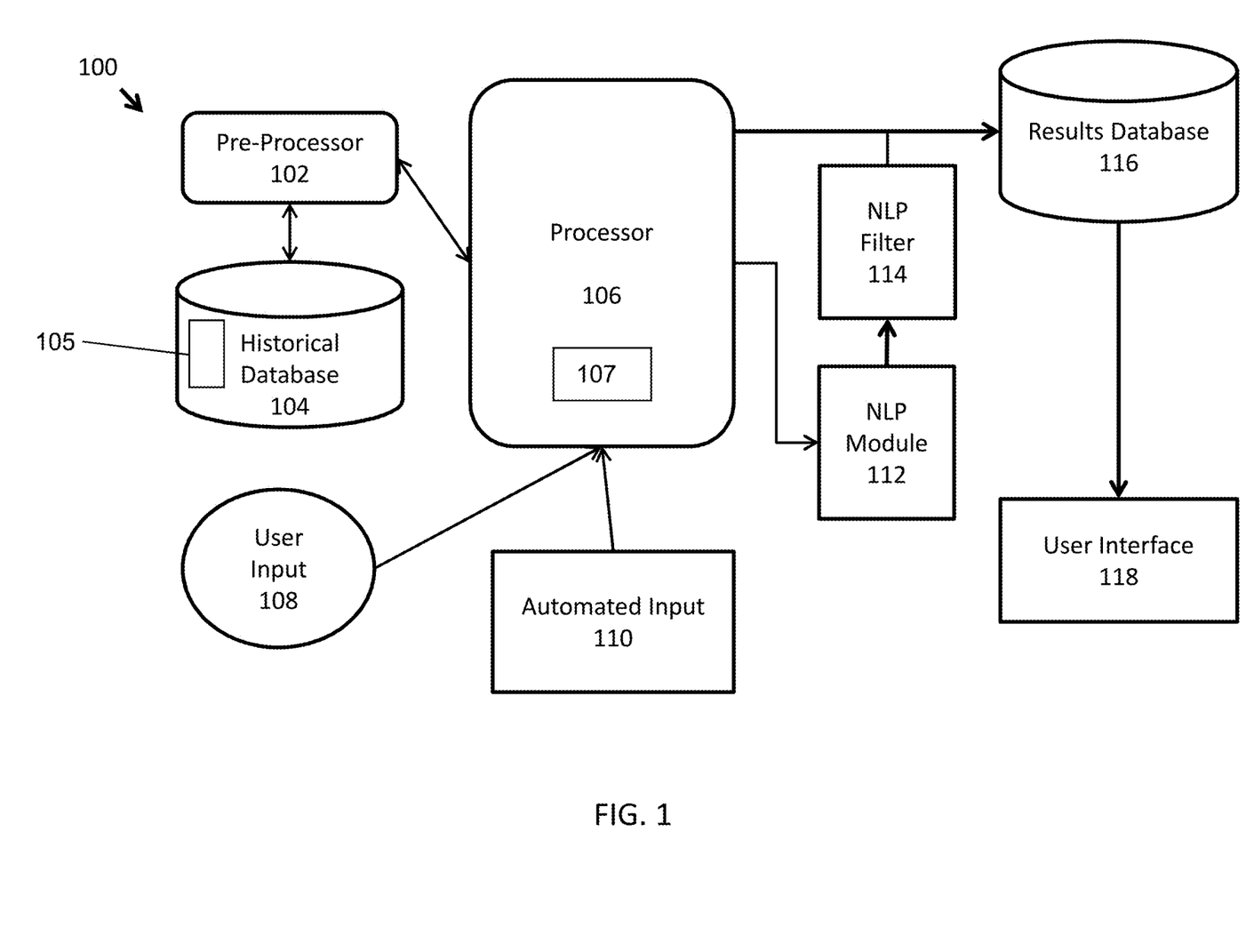
FIG. 1 is a diagram of a system for image reuse detection, according to an embodiment.

Referring to the figures, wherein like numerals refer to like parts throughout, there is seen in FIG. 1, a diagram of a system 100 for image reuse detection, according to an embodiment. As shown in FIG. 1, the system 100 comprises a pre-processor 102. In the depicted embodiment, the pre-processor 102 is a large-scale indexer. The pre-processor 102 has a historical database 104 of reference images 105 which have been processed to locate and extract keypoints according to the associated steps recited below. The reference images 105 in the historical database 104 are from a variety of sources. The reference images 105 in the historical database 104 include images obtained from open access. In other words, the system 100 retrieves images from journal articles or other publications which are readily available on the Internet. In one embodiment, they are available on the Internet via open access. The reference images 105 in the historical database 104 may also include images from non-open access publishers which have granted permission for journal article (or other publication) retrieval (such as through a publisher database). In another embodiment, reference images 105 in the historical database 104 also include images from third party submissions. Ultimately, the historical database 104 serves to provide the pool of reference images 105 for which submissions (e.g., journal articles) transmitted to the system 100 are compared.

Still referring to FIG. 1, the system 100 also comprises a processor 106. The processor 106 receives or retrieves a submission 107, such as a journal article or other publication. In an embodiment, the submission 107 is a PDF file (.pdf); however, alternative file types (e.g., .docx) can be used. In one embodiment, the submission 107 is transmitted to the processor 106 from a user input 108. For example, where the system 100 is web-based, the user input 108 is a submission upload feature at a website or web application where a user uploads the submission 107 (e.g., .pdf file of the journal article or other publication). The submission 107 is either transmitted to the processor 106 or retrieved by the processor 106.

In an alternative embodiment, the processor 106 automatically receives or retrieves submissions 107 from an automated input 110. For example, a publisher may have a submissions database, which is configured or otherwise programmed to regularly (or continuously) transmit submissions 107 stored in the submissions database to the processor 106. In another example, the processor 106 has access to the submissions database of a publisher and regularly (or continuously) retrieves submissions 107 from the submissions database.

Figure 2:
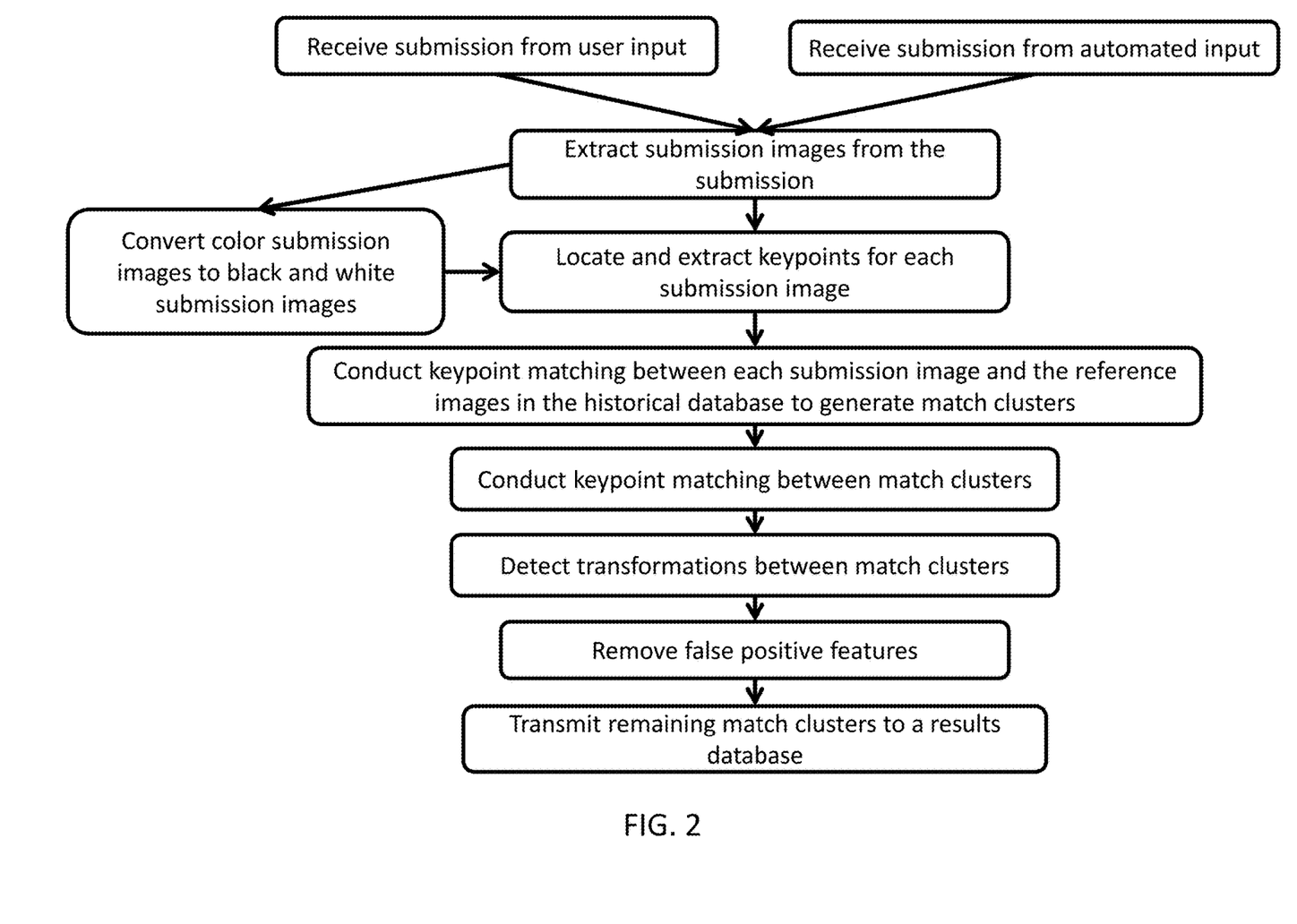
FIG. 2 is a flowchart of a method for detecting image reuse, according to an embodiment.

Referring now to FIG. 2, there is shown a flowchart of a method for detecting image reuse, according to an embodiment. Once a submission 107 is received at the processor 106 (via a user input 108 or automated input 110 as described above), the processor 106 then extracts the images from the submission 107 (hereinafter "submission images"). According to an embodiment of the system 100 used in the scientific field, the submission images are figures, which are extracted from the scientific journal articles (i.e., submissions 107). The submission images are extracted from the submissions 107 by the processor 106 using Machine Learning. Through use of Machine Learning, the processor 106 learns how images are generally distributed in PDF files and then uses that knowledge to automatically select areas of a PDF that are likely to contain images. Then, those areas are passed to the processor 106 to makes copies of those PDF areas into image files (i.e., submission images).

Specifically, one step of the method for image extraction involves detecting captions within the submission 107 (e.g., PDF). When searching for image captions, the processor 106 may look for phrases having one or more of the following characteristics: capitalization, abbreviation, varied font (i.e., bold, italicized, style), and varied alignment (e.g., left aligned or justified). These characteristics are the most commonly used in phrases comprising captions in submissions 107 such as journal articles. For example, a figure (i.e., image) in a journal article submission 107 may include "FIG. 2," using both capitalization and abbreviation. In another example, the caption for a particular figure may be a phrase on a single line that is separate from body text of the submission 107. The phrase can be spaced away from the body text and aligned with the figure (as opposed to with the body text). Thus, using the aforementioned characteristics, alone or in some combination, as filters, will allow the processor 106 to identify areas of the submission 107 having text formatted in an anomalous way. That text is classified as a caption, indicating the nearby presence of an image.

In addition to searching for captions in submissions 107, the processor 106 can also search for figures by directly parsing the submission 107 through the use of "operators." For PDF submissions 107, operators are used to encode the graphical elements of the PDF. Operators can include colors, shapes, lines, etc. By parsing the PDF for specific operators, graphical elements can be detected, allowing the processor 106 to locate figures.

In the exemplary method recited above, the processor 106 may also extract submission images from the submission 107 with the additional use of a clustering algorithm. A clustering algorithm can be used to help remove false positives from the proposed submission images. For example, the clustering algorithm can be executed by the processor 106 to locate elements around the detected graphical elements and remove any elements that are not part of, or in the proximity of, that cluster. According to this method, text that is likely not part of the figure will be removed. In addition, adjacent figures will be identified as separate submission images because they will be split along the whitespace between them. Therefore, a clustering algorithm can be used to fine-tune the process of image extraction.

At the following step, if the submission images are in color (as opposed to black and white), the submission images are converted to black and white (or grayscale) images by the processor 106. Color submission images are converted to black and white (or grayscale) according to known methods, such as by using a nonlinear RGB color model. If the image has an alpha channel, the channel is discarded, removing any variation in opacity. Then, the luminance (i.e., amount of whiteness) is computed using standard contemporary CRT phosphors values according to the following equation: $0.2125\ R + 0.7154\ G + 0.0721\ B$, where R, G, and B are the amount of Red, Green, and Blue respectively.

Upon extraction of the submission images (and conversion to black and white, if necessary), the submission images are transmitted to the historical database 104 for storage. The submission images may be stored long-term or temporarily. The storage of submission images received from a user input 108 or automated input 110 can be customized.

For example, a user (via the user input 108) or publisher (via the automated input 110) providing the submission images, may select that the submission images be stored on the historical database 104 for only the duration of the processing of the submission images.

Figure 4:
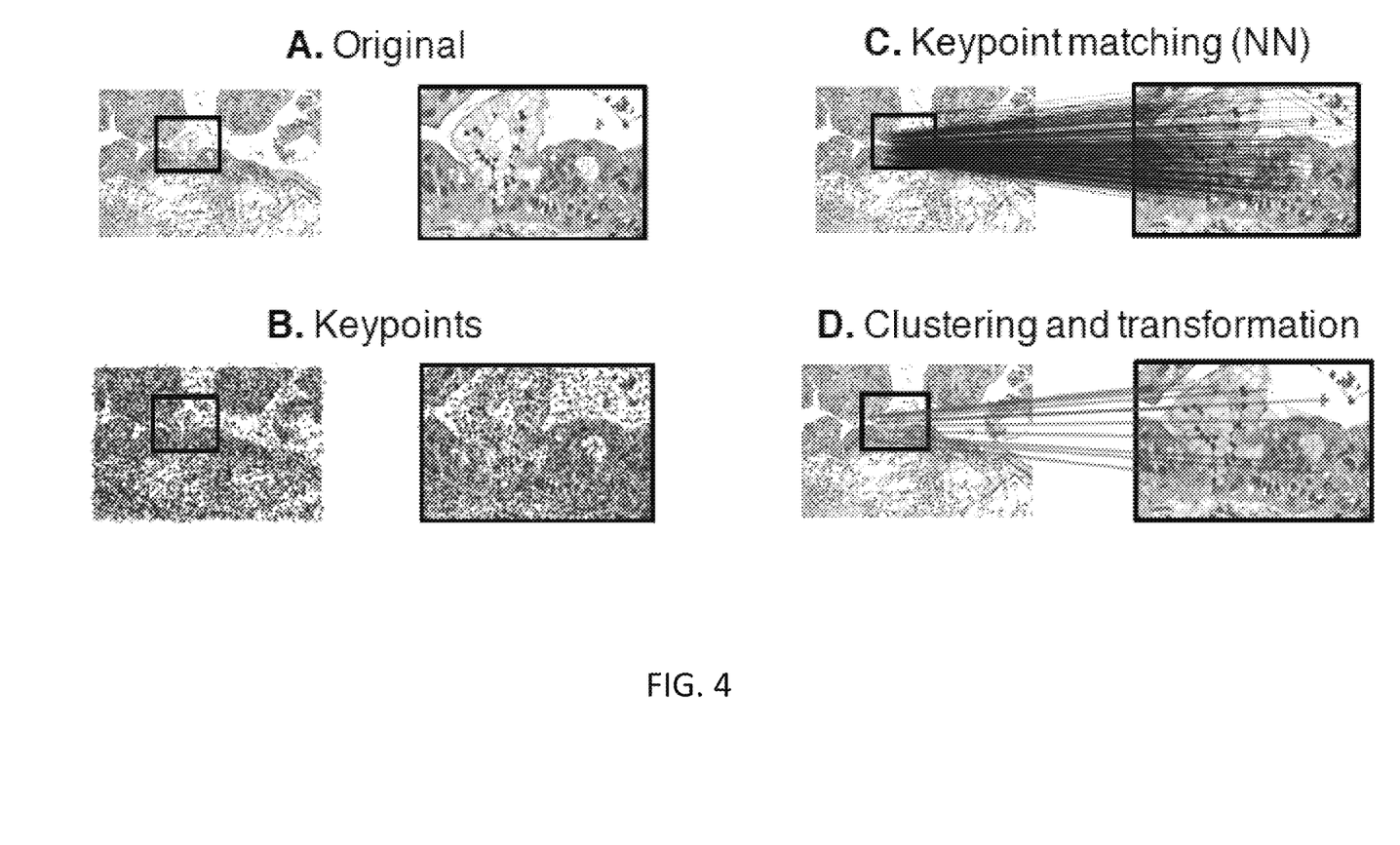
FIG. 4 shows diagrams of the different steps of keypoint matching.

At the next step, as shown in FIG. 4, a copy-move detection algorithm is then applied by the processor 106 to each submission image. The copy-move detection algorithm is a combination of image processing algorithms. The copy-move detection algorithm first locates and extracts "keypoints" of the submission image. The original submission image is shown in image(A) of FIG. 4 and the keypoints of the submission image are shown in image(B) of FIG. 4. The keypoints are located and extracted using a scale-invariant feature transform ("SIFT") keypoint detection algorithm with a low threshold or any other keypoint computation method (e.g., BRIEF). The SIFT keypoint detection algorithm and any other keypoint computation method provides an efficient and effective compromise between speed and robustness. As understood by one of ordinary skill in the art, the SIFT keypoint detection algorithm translates the submission image into feature vectors. Feature vectors are particularly helpful in detecting inappropriate image reuse because they remain constant through many of the common distortion methods used to generate a reused image, such as rotation, enlargement (or other scaling alterations), and translation. Thus, the feature vectors are effective in comparing the submission image to reference images 105.

In an embodiment wherein the number of keypoints is large, the keypoints of the submission image are partitioned to create a more workable area for keypoint matching, as shown in FIG. 4, image(B) and image(C). For example, the keypoints may be partitioned such that the keypoint matching was a $n^2$ problem prior to partitioning and is a log n problem thereafter.

After the keypoints (i.e., feature vectors) are located and extracted from the submission image, the keypoints are compared to those of the reference images 105 in the historical database 104 in order to find keypoint matches. A nearest neighbor algorithm is used to find keypoint matches, as shown in FIG. 4, image(C). Specifically, the processor 106 locates the two nearest neighbors in Euclidian space across all keypoints detected in the submission image. In one embodiment, the nearest neighbor is a keypoint in which the distance of the nearest neighbor is 60% or less than the distance of the second nearest neighbor. In an embodiment, keypoints that do not have matches or that have matches that are less than 40 pixels apart, for example, are removed or otherwise excluded from the matching process.

Next, agglomerative clustering of the remaining keypoints is performed by the processor 106, as shown in FIG. 4, image(D). In one embodiment, the agglomerative clustering uses a single linkage method and a minimum distance of 30 pixels to form flat clusters. In an embodiment, clusters with less than 40×40 square pixels of area are removed or otherwise excluded from the matching process. The generated clusters are then analyzed by the processor 106. If within a first cluster, more than three keypoints are matched against the same second cluster, then those two clusters (i.e., the first cluster and the second cluster) are defined as matched clusters.

Figure 5:
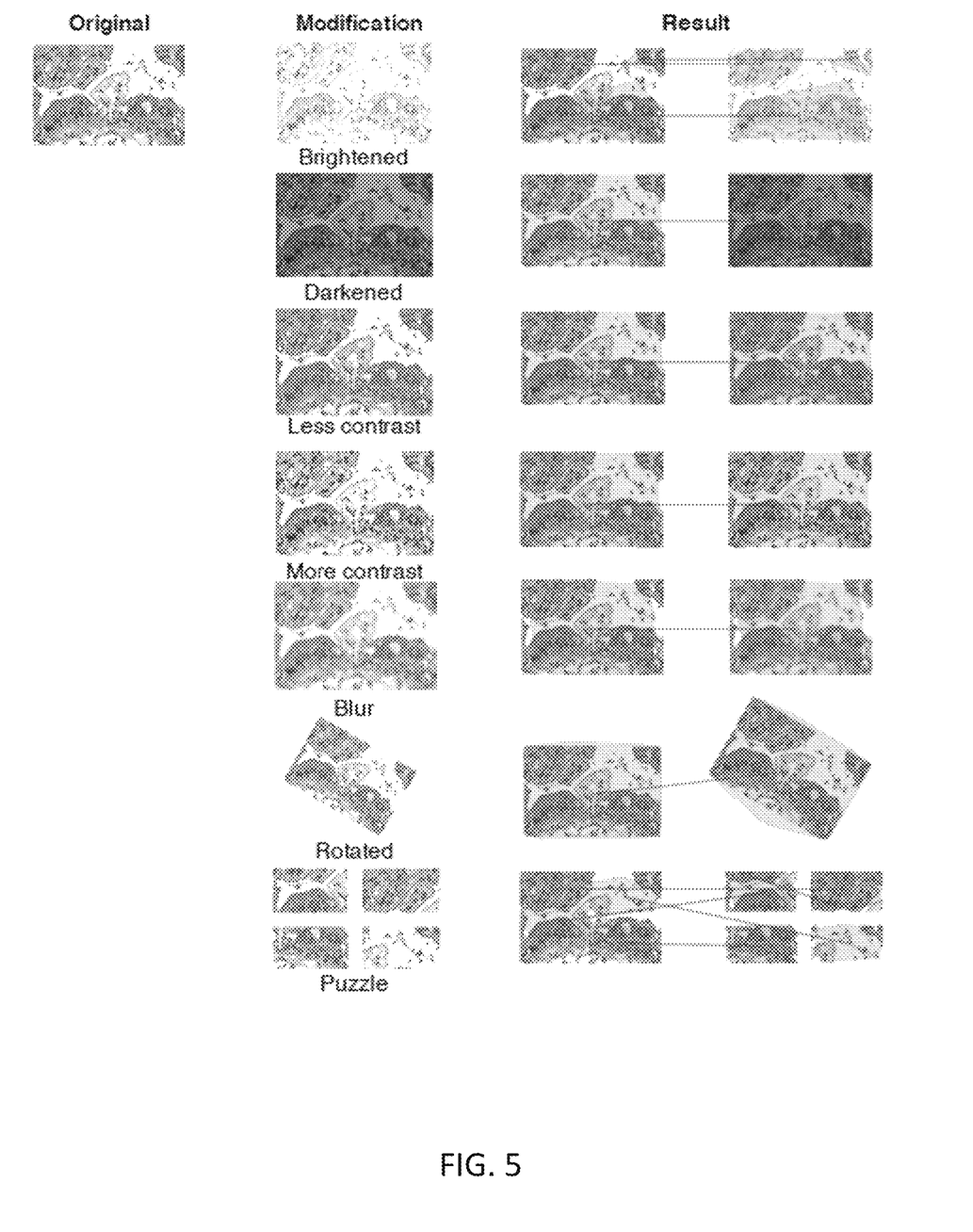
FIG. 5 is a diagram showing different detectable transformations.

Thereafter, a RANSAC algorithm is applied by the processor 106 to find the affine transformations between matched clusters, as also shown in FIG. 4D. Examples of different types of detectable transformations are shown in FIG. 5. Such transformations may include a variation in brightness/darkness, level of contrast, clarity/blurriness, and rotation. Another transformation that may be detected is a puzzle transformation wherein portions of the reference image 105 have been cut or removed, then rotated, and replaced back in with the remainder of the reference image 105. In one embodiment, if less than 80% of the keypoints are used by the RANSAC algorithm or the mean squared error of the affine transformation is more than 40, the matched cluster is removed or otherwise excluded from the matching process. In another embodiment, if the sheer of the estimated transformation is more than 15 degrees, the matched cluster is removed or otherwise excluded from the matching process.

The matched clusters are then processed (via the processor 106) using a patch detector. The patch detector removes features likely to generate false positives for inappropriate image reuse. These features are areas that are naturally similar and/or generally occurring in many images in submissions (e.g., scientific articles). For example, many figures (i.e., images) in scientific articles use similar text and shapes to describe areas of a graph, such as axis labels and arrows. Therefore, the copy-move detection algorithm would find matches between the reference images 105 and the submission image for these graph text and shapes, resulting in numerous keypoint matches.

Figure 3:
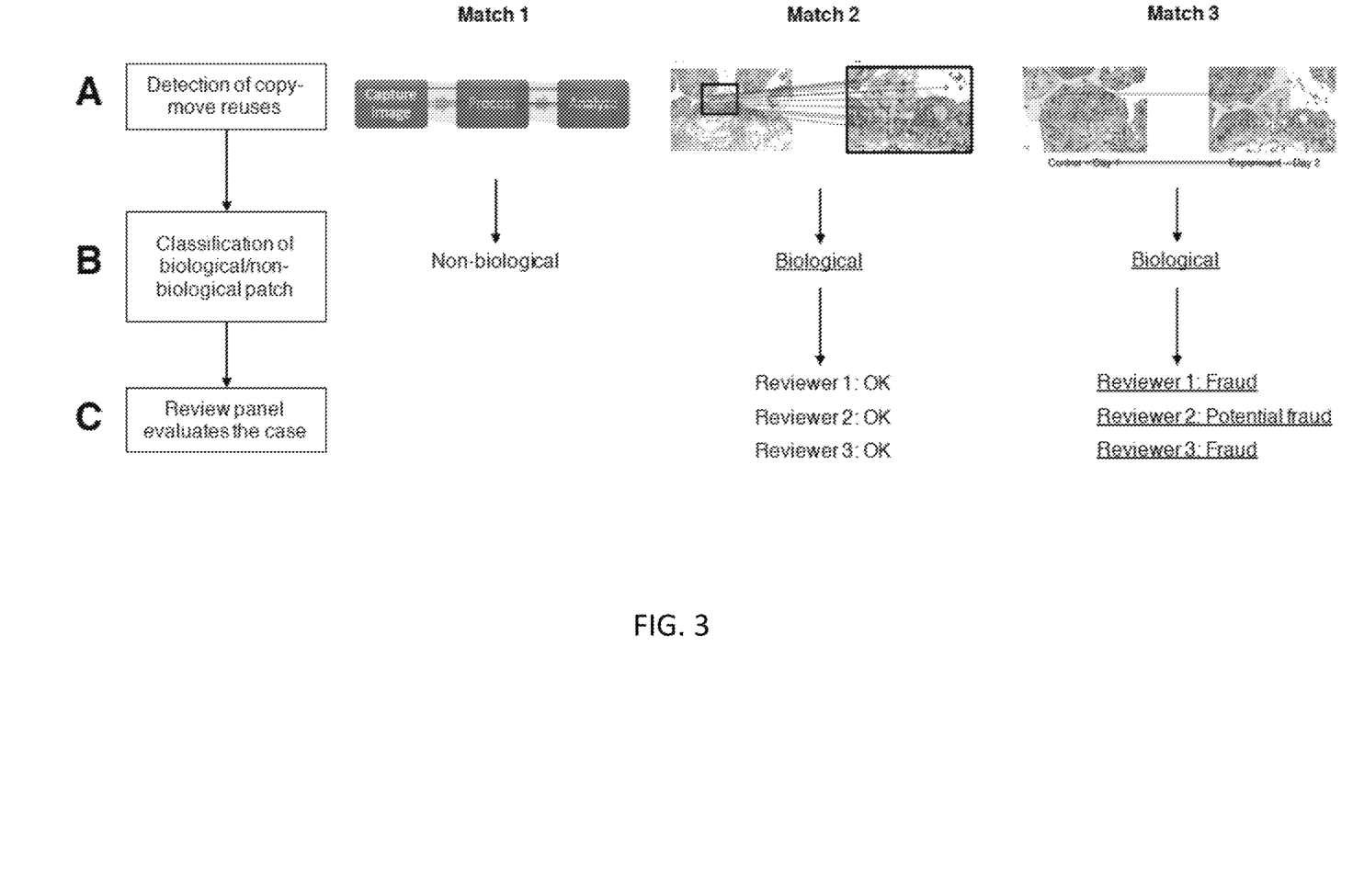
FIG. 3 is a flowchart of a method for applying a biomed patch detector to submission images, according to an embodiment.

In one embodiment wherein the processor 106 uses a patch detector, the patch detector is a mathematical function that computes the probability of an image patch to be biomedical, as shown in FIG. 3. This patch detector is trained on a custom set of images that were classified by an expert and then, several features about those patches are computed so as to build a relationship between them and the likelihood that the expert labeled them as biomed patches. These features are the 15-bin three channel histogram of pixel intensity, features from the gray level co-occurrence matrix using 20-pixel distances at 0 angles with 256 levels, symmetric, and normed including the expected absolute difference in gray levels, expected correlation between gray levels, and the 10-bin histogram of gradients with 8 orientations and 16 pixels per cell. The biomed patch detector determines whether features in the matched cluster are likely biomedical images or false positive features (i.e., graph text and shapes), which are not unique or unrelated to biomedical material. In the embodiment depicted in FIG. 3, the biomed patch detector classifies the matches in "Match 1" as non-biological features of the submission image. As shown in the submission image for "Match 1," the submission image includes features, such as a flowchart with text, not biological material. For comparison, the submission images shown in "Match 2" and "Match 3" include biological features, such as features of a cancerous cell, for example. The matched clusters with only non-biological features are removed or otherwise excluded from the matching process. The biomed patch detector can be trained such that false positive features and other non-biological features can be removed if they are not labeled patches.

In an embodiment, natural language processing is used to provide context to the submission images (i.e., figures) to aid in determining if the submission image is a reused image or a false positive image. For example, a scientific article (submission) may include a figure (i.e., submission image) that occurs in another scientific article. However, the figure in the scientific article may be properly cited or have an accompanying description justifying appropriate reuse of that figure, for example. The processor 106 can be trained via a natural language processing (NLP) module 112 (FIG. 1) to detect words or phrases which would indicate such appropriate reuse of the figure (i.e., submission image).

In use, the NLP module 112 provides language which is determined to be indicative of an appropriate reuse justification or innocent intention to a NLP filter 114 (FIG. 1). The matched clusters are then processed through the NLP filter 114 to determine context for the match. If an appropriate reuse justification can be determined, the matched cluster is removed or otherwise excluded from the matching process. If no appropriate reuse justification can be determined, the matched cluster is transmitted to a results database 116, as shown in FIG. 1.

Still referring to FIG. 1, after keypoint matches (i.e., match clusters) have been made (or after natural language processing, as described above), the matches are transmitted to a results database 116. The results database 116 stores (permanently or temporarily) the keypoint matches. As shown in FIG. 1, the results database 116 is accessible via a user interface 118. In one embodiment, the user interface 118 is a website or web-based application, for example. The user interface 118 allows the user to retrieve the matches from the results database 116.

In an embodiment, the user verifies the results by reviewing the matches. In other words, the user looks at the submission image and compares it to the matched references image. In an embodiment, access to the results database 116 via the user interface 118 is customizable. Specifically, access to the results database 116 can be customized such that multiple users (i.e., reviewers) will have access to the matches or a particular collection of matches.

Figure 6:
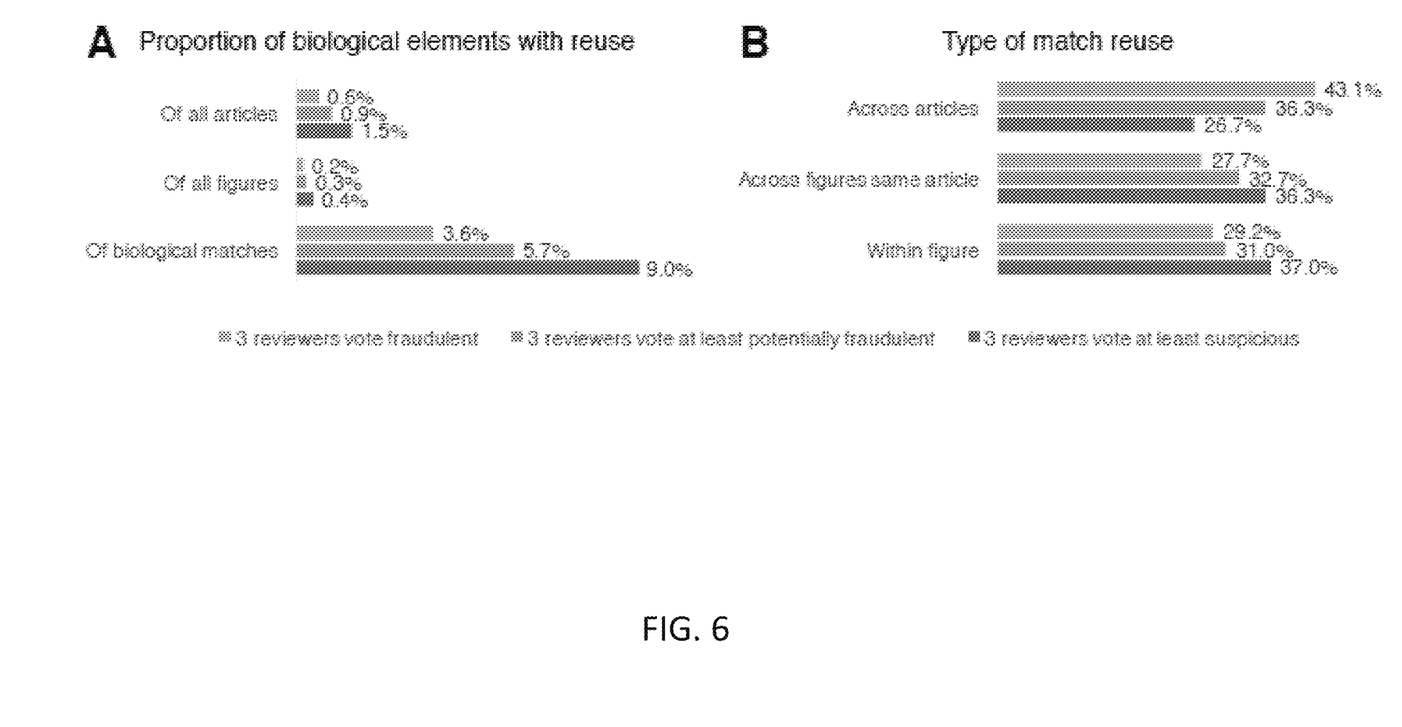
FIG. 6 shows graphs of the results of the copy-move algorithm.

In an alternative embodiment, the processor 106 has a threshold value for the likelihood that the keypoints occur in both the submission image and the matched reference image. The processor 106 calculates a statistic representing the probability that the match would happen at random. The calculated statistic is compared to the threshold value. If the calculated statistic is below the threshold value, the keypoint matching is said to have occurred intentionally or fraudulently through scientific misconduct. Matches having a calculated statistic above the threshold value are either not transmitted to the results database or transmitted with an indication that the match likely happened at random, without scientific misconduct. Test results of copy-move detection algorithm described above are shown in FIG. 6, image(A) and image(B).

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A method for image reuse detection, comprising the steps of:
   receiving a submission at a processor from at least one of a connected user input and a connected automated input;
   extracting a submission image from the submission via the processor;
   locating and extracting keypoints from the submission image via the processor;
   comparing the keypoints from the submission image to keypoints from a reference image via the processor;
   wherein the reference image stored in a historical database connected to the processor;
   finding a plurality of matches, wherein in each match, a distance between two of the keypoints from the submission image is the same as the distance between two of the keypoints from the reference image, resulting in matched keypoints;
   wherein there are unmatched keypoints in the submission image and the reference image;
   clustering the unmatched keypoints in the submission image, forming a first cluster;
   clustering the unmatched keypoints in the reference image, forming a second cluster;
   matching the unmatched keypoints of the submission image in the first cluster with the unmatched keypoints of the reference image in the second cluster, forming a first matched cluster; and
   detecting a transformation between the first cluster and the second cluster.

2. The method of claim 1, further comprising the step of applying a patch detector to the first matched cluster, via the processor.

3. The method of claim 2, wherein the patch detector detects at least one of arrows and an axis label in the submission image.

4. The method of claim 2, wherein the patch detector determines if the submission image comprises biomedical material.

5. The method of claim 1, further comprising the step of applying a natural language processing (NLP) filter, via the processor, to the first matched cluster.

6. The method of claim 1, further comprising the step of transmitting, via the processor, the matched keypoints and the first matched cluster to a results database connected thereto.

7. The method of claim 6, wherein the results database is accessible via a user interface.

8. The method of claim 7, further comprising the step of displaying the first matched cluster at the user interface.

9. The method of claim 1, further comprising the step of partitioning the keypoints from the submission image, via the processor.

10. The method of claim 1, wherein the keypoints from the submission image include a first keypoint, a second keypoint, and a third keypoint, and a distance between the first and second keypoints is less than or equal to 60% of a distance between the first and third keypoints.

11. The method of claim 1, further comprising the step of converting the submission image to black-and-white.

12. The method of claim 1, further comprising the step of transmitting the submission image to the historical database for storage.

13. A method for image reuse detection, comprising the steps of:
   receiving a submission at a processor from at least one of a connected user input and a connected automated input;
   extracting a submission image from the submission via the processor;
   locating and extracting keypoints from the submission image via the processor;
   comparing the keypoints from the submission image to keypoints from a reference image via the processor;
   wherein the reference image is stored in a historical database connected to the processor;
   applying a nearest neighbor algorithm, via the processor, to the keypoints from the submission image and the keypoints from the reference image, resulting in one or more matched keypoints;
   transmitting, via the processor, the one or more matched keypoints to a results database connected thereto;
   displaying the matched keypoints at a user interface connected to the results database; and
   detecting a transformation between the reference image and the submission image.

14. The method of claim 13, wherein for each matched keypoint, a first neighbor keypoint is a first distance therefrom and a second neighbor keypoint is a second distance therefrom, the first distance being 60% or less than the second distance.

15. A system for image reuse detection, comprising:
   a pre-processor storing a plurality of reference images;
   wherein each of the plurality of reference images includes a plurality of reference keypoints;
   a processor connected to the pre-processor, the processor adapted to receive or retrieve a submission;
   wherein the submission comprises one or more submission images, each having a plurality of submission keypoints;
   wherein at least some of the plurality of submission keypoints match at least some of the plurality of reference keypoints, resulting in a matched image;
   a results database connected to the processor storing the matched image; and
   wherein the matched image indicates a transformation between the reference image and the one or more submission images.

16. The system of claim 15, further comprising a user interface connected to the results database, wherein the matched image is transmitted by or retrieved from the results database and displayed at the user interface.

17. The system of claim 15, further comprising a user input connected to the processor, wherein the submission is a user-uploaded submission transmitted from the user input to the processor.

18. The system of claim 15, further comprising an automated input connected to the processor, wherein the submission is retrieved or received by the processor from the automated input at a time interval.

19. The system of claim 15, further comprising a natural language processing (NLP) module connected to the processor, wherein the NLP module is adapted to search the submission for text.

20. The system of claim 15, wherein the reference images are stored in a historical database connected to the pre-processor.

* * * * *